Nov. 22, 1949     R. A. CHRISTIE     2,488,707
AGRICULTURAL IMPLEMENT
Filed Oct. 8, 1945
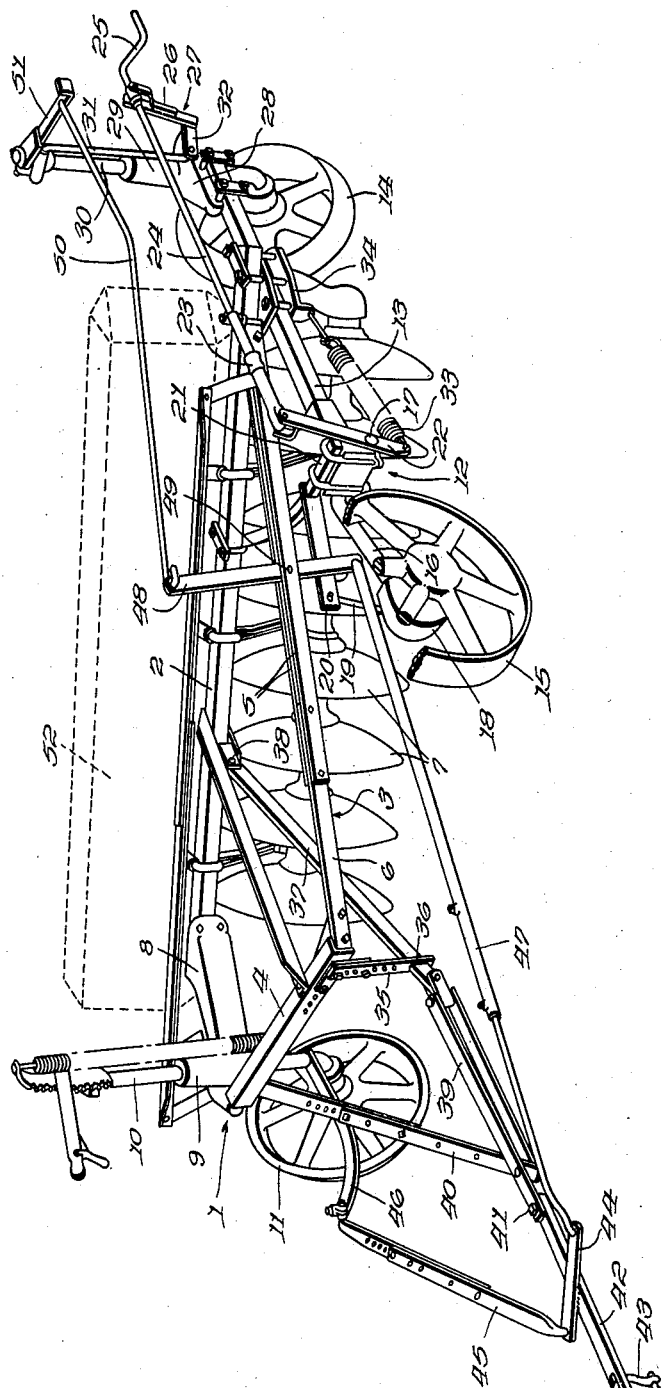
Inventor:
R. A. Christie.
By Paul O. Pippel
Atty Patented Nov. 22, 1949

2,488,707

UNITED STATES PATENT OFFICE 2,488,707

AGRICULTURAL IMPLEMENT

Reginald A. Christie, Ancaster Township, Wentworth County, Ontario, Canada, assignor to International Harvester Company of Canada, Limited, Hamilton, Ontario, Canada, a corporation of Ontario Application October 8, 1945, Serial No. 621,042

1 Claim. (Cl. 97—102)

This invention relates to agricultural implements and more particularly to plows of the gang-type, wherein disks or the like are mounted on a wheeled frame propelled by a tractor or other suitable source of power and adapted to be drawn therebehind.

A plow of the type with which the present invention is concerned comprises generally a tool-carrying beam arranged diagonally to the direction of travel and supported at the front by a furrow wheel and at the rear by a transverse truck carrying a land wheel and a rear furrow wheel. In such plows the tool-carrying frame is usually raised and lowered with respect to the supporting wheels by power derived from the land wheel and transmitted to the other wheels. Since the plow frame is often large and heavy, it is important that suitable provisions be made to cause the plow to follow the propelling vehicle upon turning thereof. Where the front furrow wheel has been steered the rear furrow wheel has often been allowed to caster freely, although due to the weight and size of these plows, the latter method has involved difficulties and steering has not been easy. When steering both front and rear wheels, the front wheel is generally connected to the rear wheel by a rod extending above the frame and preferably connecting steering arms at the top of vertical spindles upon which the wheels are mounted and upon which the plow frame slides when raising and lowering the working tools. Where seed or fertilizer dispensers were mounted on the frame, steering of the rear furrow wheel has not generally been practiced due to the difficulty in by-passing the dispenser in transmitting steering motion from the front to the rear furrow wheel.

The present invention obviates the difficulties previously encountered and the principal object thereof is to provide an improved steering mechanism for agricultural implements.

Another object is to provide in a plow of the disk or harrow type improved means for transmitting steering motion from a propelling vehicle to the front and rear wheels thereof to cause the plow to follow in the path of the vehicle by which it is drawn.

Another object is to provide in a trail-behind implement having front and rear furrow wheels novel means for transmitting steering motion direct to the front furrow wheel and to the rear furrow wheel simultaneously.

Another object is to provide in a plow of the type described, having a laterally swingable hitch for connection to a tractor or the like, a transverse bar fixed on the hitch, linkage steerably connecting one end of the bar to the front furrow wheel and linkage steerably connecting the other end of the bar to the rear furrow wheel, whereby lateral movement of the hitch is transmitted to both furrow wheels.

Other objects and advantages will become clear from the following detailed description when read in conjunction with the accompanying drawing showing in perspective a harrow plow embodying the features of the present invention.

Referring to the drawing, the numeral 1 designates generally a plow frame including a diagonally disposed plow beam 2, a supporting side bar 3, and a front bar 4. Side bar 3 comprises a pair of laterally spaced straps 5 connected to the beam 2 near its rear end and a single strap 6 connected at one end to the front bar 4 and secured between the spaced straps 5 at its other end.

Beam 2 supports a plurality of working tools in the form of disks 7 and at the forward end of the beam is secured a forwardly extending frame member in the form of a casting 8 to which is affixed a vertically extending sleeve member 9 having rotatably mounted therein the vertically extending portion of a spindle 10, the lower end of which is bent outwardly and has mounted thereupon a furrow wheel 11.

To the rear end of beam 2 is adjustably secured a transversely extending truck generally indicated at 12 comprising a beam 13 having mounted upon opposite ends thereof a rear furrow wheel 14 and a land wheel 15. Land wheel 15 is mounted upon the end of a crank-axle 16 having a transverse portion 17 pivotally mounted in the end of beam 13 for generally vertical swinging movement to raise and lower the plow frame. Actuation of the land wheel 15 to raise and lower the plow frame is accomplished by the use of a half-revolution clutch shown at 18 which may be of a conventional type well known in the art and requiring no detailed description here. It may be noted that the clutch reacts through a link 19 against a brace 20 mounted upon a bar 21 secured to the end of the beam 13 to swing the crank-axle 16 about its pivot upon the beam.

The outer end of the transverse portion 17 of crank-axle 16 has mounted thereupon a lever arm 22 having its upper end bifurcated to receive a sleeve member 23 which is threaded to receive the threaded end of a rod 24 having a crank 25 at the other end thereof pivotally mounted in one arm 26 of a bell-crank 27 pivoted upon a casting 28 mounted upon the end of beam 13 opposite the land wheel 15. Casting 28 is provided with a vertically extending sleeve portion 29 in which is rotatably mounted the vertically extending portion of a spindle 30, the lower end of which is bent outwardly in a manner similar to spindle 10 and has mounted thereupon the rear furrow wheel 14.

Spindle 30 is vertically slidable in the sleeve 29 to raise and lower the plow frame with respect to the furrow wheel 14 and is held in position with respect to the sleeve 29 by a link 31 secured at its upper end to the top of spindle 30 and pivoted at its lower end to the other arm 32 of bell-crank 27. Vertical swinging movement of the land wheel 15 through the actuation of clutch 18 to raise and lower the frame is thus transmitted through bell-crank 27 to rear furrow wheel 14. The manner in which this movement is transmitted to the front furrow wheel 11 to raise and lower the frame with respect thereto forms no part of this invention, lifting being accomplished in a manner similar to that described for the rear furrow wheel 14. For a more detailed disclosure of the lifting mechanism reference may be had to co-pending application Serial No. 621,094 filed October 8, 1945, now Patent No. 2,469,579, dated May 10, 1949. Lifting of the rear furrow wheel 14 is assisted by a spring 33 connected at one end to the lower end of lever 22 projecting below the pivot 17 and connected at its other end to a clamp 34 by which the beam 13 is adjustably secured to the beam 2.

At this point it should be clear that in an implement of the type shown and described, the beam 2 and the disks 7 carried thereby extend in a direction diagonal to the direction of travel of the plow, so that front furrow wheel 11 is permitted to travel in a previously formed furrow while the rear furrow wheel 14 is laterally spaced therefrom a distance equal to the width of cut of the working tools, and travels in the new furrow made thereby. Land wheel 15, it will be noted, is likewise laterally spaced from both the furrow wheels 11 and 14 and is adapted to ride upon the unplowed ground.

Secured to the front bar 4 at one end thereof and projecting downwardly therefrom is a strap 35, the lower end of which is apertured at 36 to receive for sliding movement therein one end of a draft bar 37, the rear end of which is connected at 38 to the beam 2 medially of the ends thereof. The forward end of draft bar 37 projects through the opening 36 and has pivotally connected thereto a forwardly extending draft member 39 which is braced against lateral pivotal movement by an adjustable brace 40, one end of which is pivotally connected to the member 39 near the forward end thereof and the other end of which is secured to the casting 8. Likewise pivotally connected to the forward end of hitch member 39 at 41 for lateral swinging movement is a hitch member 42, the forward end of which is provided with a clevis 43 for attachment to a tractive vehicle, such as a tractor or the like.

Due to the weight and structure of an implement of this type, it is important that the supporting wheels thereof follow in the path of the tractor, or the like, particularly when turns are made in the field being worked. It is therefore important that the furrow wheels 11 and 14 be steered to prevent their scraping upon the ground and the probable injury to the implement incident thereto. Therefore, mechanism is incorporated in the implement of the present invention to insure proper guidance of the supporting wheels to cause them to follow in the path taken by the tractor or other vehicle. It is, of course, clear that upon turning the draft vehicle, as at the end of a field, force will be exerted upon the pivoted hitch member 42 to cause it to swing to one side, or the other about its pivot at 41, depending upon the direction in which the tractor is turning.

In order to transmit this turning action to the furrow wheels 11 and 14 to steer the same in response to turning of the tractor, the hitch member 42 has secured thereto medially of its ends a cross-bar 44. One end of the bar 44 is pivotally connected by an adjustable link 45 to a steering arm 46 affixed to the spindle 10 adjacent its lower end. Lateral swinging of the hitch 42 is thus transmitted through the link 45 and steering arm 46 to the front furrow wheel 11 to turn it in the proper direction for following in the path of the draft vehicle. In order to transmit this turning power likewise to the rear furrow wheel 14, the other end of cross-bar 44 has pivotally attached thereto one end of a connecting rod 47 which is adjustable in length and connected at its rear end to the depending portion of a lever 48 pivotally secured at 49 between the straps 5 on the side bar 3. The end of bar 48 projecting upwardly from the pivot 49 has pivoted thereto the forward end of a connecting rod 50, the rear end of which is connected to a steering arm 51 secured to the upper end of spindle 30 upon the lower end of which the rear furrow wheel 14 is mounted. Thus a simple and effective mechanism is provided for transmitting steering motion through the hitch member 42 simultaneously to the front and rear furrow wheels of the implement of the present invention. Likewise steering is transmitted from the lower level of the hitch 42 to the steering arm 51 located at the top of the rear furrow wheel spindle 30, while at the same time avoiding interference with the operating parts of the plow. Sufficient play is provided in the connections of the rods 50 and 47 with the lever 48 and the bar 44, as well as the connections of the hitch 42 to the front furrow wheel 11 to permit vertical movement of the plow frame with respect to the furrow wheels.

It may be noted that the steering mechanism just described is of special advantage when the plow is utilized with a dispenser for seed or fertilizer, or the like, such as is indicated in dotted lines at 52 in the drawing, the dispenser box 52 generally being of a length corresponding to the length of the tool beam 2 and extending longitudinally thereof so that seed or fertilizer, or the like, dispensed therefrom may be deposited in the ground at a location adjacent the cutting disks 7. The steering mechanism and particularly the structure by which steering is transmitted to the rear furrow wheel 14 simultaneously with turning of the tractor and steering of front furrow wheel 11 was designed to provide a more efficient steering mechanism than has previously been devised for plows of this type, and to avoid interference with other operating parts of the plow.

It is believed that the operation of the steering structure of the plow of the present invention has been made clear by the foregoing description. It should likewise be understood that the invention has been described in its preferred embodiment and that modifications may be made therein without departing from the spirit of the invention or the scope of the appended claim.

What is claimed is:

In an agricultural implement of the trail-behind type, a tool-supporting frame having a draft structure, hitch means for connection to a propelling vehicle and laterally swingable on the draft structure in response to turning of the vehicle, a transverse bar affixed to the hitch means, vertical sleeve sections carried at front and rear ends of the tool-supporting frame, a rotatable spindle extending through each said sleeve section and carrying a ground supporting wheel at the lower end thereof, adjustable means for moving the tool-supporting frame up and down on the spindles to raise and lower the tools, a steering arm at the lower end of the front wheel spindle, means steerably connecting said arm to one end of said transverse bar, a steering arm at the upper end of the rear wheel spindle, means steerably connecting the latter said arm to the other end of the transverse bar, said latter connecting means including a vertical lever pivoted intermediate its ends on the tool-supporting frame, a link connecting the upper end of said lever to the steering arm on the rear wheel spindle, and linkage connecting the lower end of the lever to said transverse bar, whereby lateral swinging of the hitch means is transmitted to guide the said supporting wheels.

REGINALD A. CHRISTIE.

REFERENCES CITED

The following references are of record in the file of this patent:

UNITED STATES PATENTS

| Number | Name | Date |
| --- | --- | --- |
| 1,073,827 | Waite | Sept. 23, 1913 |
| 1,409,712 | Hansmann | Mar. 14, 1922 |
| 1,918,730 | Willson | July 18, 1933 |
| 2,378,635 | Hyland | June 19, 1945 |